Nov. 15, 1955     R. E. LANGLOIS ET AL     2,723,876
PARACHUTE RELEASE
Filed July 21, 1951
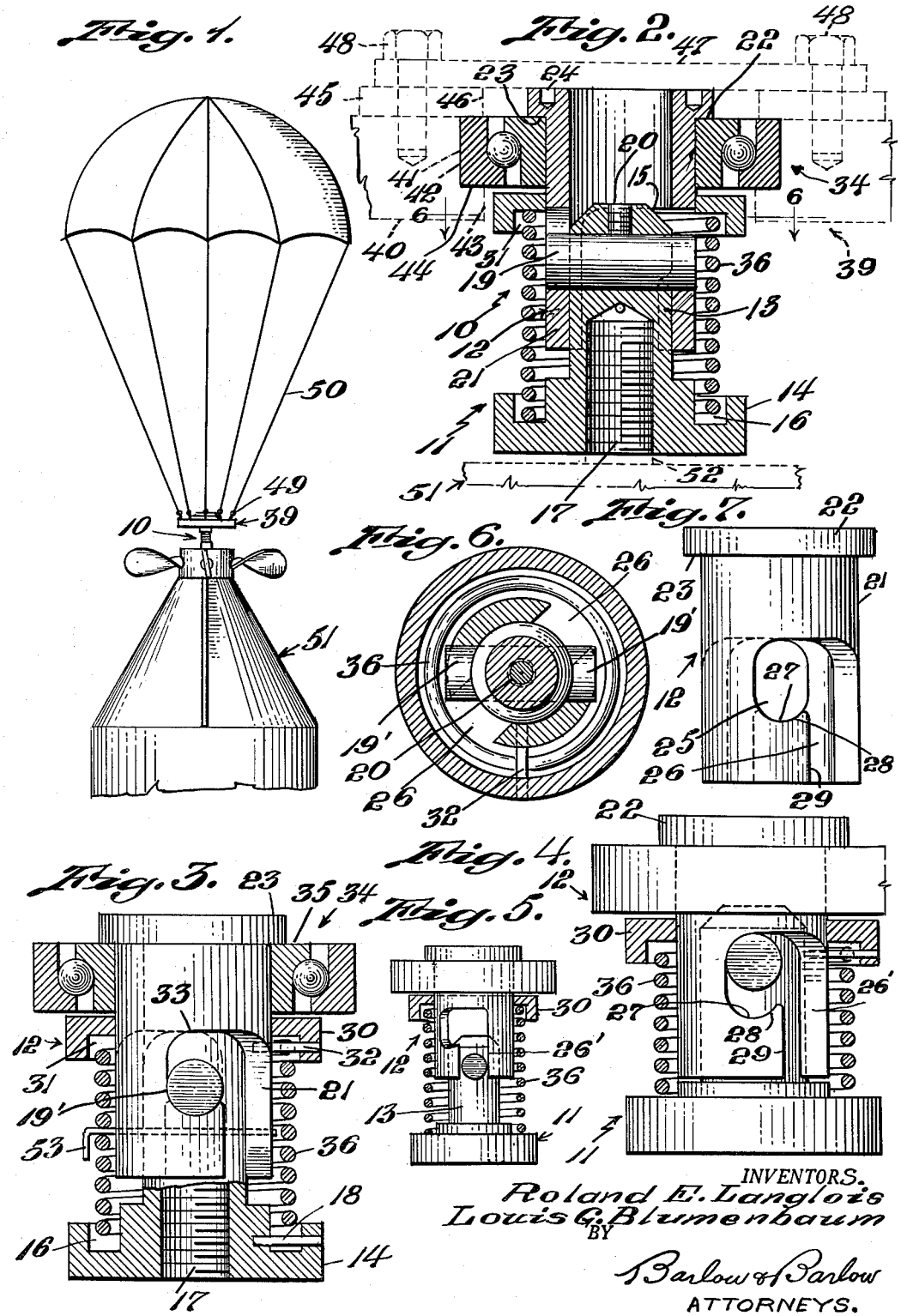
INVENTORS.
Roland E. Langlois
Louis G. Blumenbaum
BY
Barlow & Barlow
ATTORNEYS.

United States Patent Office 2,723,876
Patented Nov. 15, 1955

2,723,876

PARACHUTE RELEASE

Roland E. Langlois, West Warwick, and Louis G. Blumenbaum, Cranston, R. I., assignors to Technical Service, Inc., a corporation of Rhode Island Application July 21, 1951, Serial No. 237,868

7 Claims. (Cl. 294—83)

This invention relates to a parachute load release device.

It is desirable that a device or apparatus of this character operate to immediately release the load from the parachute upon landing in order to prevent the said parachute from carrying or dragging the load beyond the area in which the landing is to take place.

It is also essential in warfare that a missile, such as a torpedo, launched from an airplane and controlled in its fall by a parachute, be released at substantially the instant it strikes the surface of the water if the torpedo is to fulfill its mission. Various devices have been proposed but to our knowledge none has attained a degree of efficiency in operation required.

An object of the invention is to provide a parachute load release device which will be of an effective but simple construction having few moving parts and insure a high degree of efficiency.

Another object of the invention is to provide a device of the above character which will be free of any timing mechanism and the like and which will operate automatically to release the parachute at substantially the instant the load lands.

A more specific object of the invention is to provide a device of this character so constructed as to be operable to utilize the impact on the load upon the landing thereof as a means to initiate the action of the release mechanism to free the parachute from the load.

Another object of the invention is the provision of a device so constructed that the weight of the load and the opposing force of the parachute will be utilized to further provide a means to hold the device in the locked position.

Another object of the invention is the provision of a device of this character so constructed as to require opposite axial movement in the direction of the falling load to initiate the release mechanism of the device.

Another object of the invention is the provision of a device so constructed as to provide for the locking of the device in a preset condition at the place of manufacture.

With these and other objects in view, the invention consists of certain novel features of construction, as will be more fully described and particularly pointed out in the appended claims.

In the accompanying drawings:

Figure 1 is an elevational view illustrating a device embodying the invention attached to the parachute and load carried thereby;

Figure 2 is a central sectional view of the parachute releasing device shown in Figure 1;

Figure 3 is a view partly in section showing the device of Figure 2 turned about 90 degrees;

Figure 4 is a substantially similar view but showing the elements thereof in a different position;

Figure 5 is also a similar view to that shown in Figure 4 but on a reduced scale and showing the parts of the device in the act of being separated from each other;

Figure 6 is a sectional view taken substantially along line 6—6 of Figure 2; and Figure 7 is an elevational view of one of the members.

Referring to the drawings, in which we have illustrated a simple embodiment of our invention, 10 designates generally a device comprising a latch member 11 and a catch or keeper member 12. The latch member has a cylindrical body 13 provided at one end thereof with a circular flange 14 and the other end of said body may be tapered as at 15. An annular groove 16 is provided on the inner side of said flange and a threaded opening 17 extends axially at the center of said body from the outer side of said flange 14. An abutment 18 (see Figure 3) which is in the form of a pin secured to the flange 14 extends radially into the groove 16. A latch element 19, which may conveniently be in the form of a cylinder, passes diametrically through the outer portion of the body 13 at a location beneath the tapered portion 15 and extends at equal distances beyond the sides of the body providing projections 19'. This element 19 is secured in position as by means of a screw 20.

The catch or keeper member 12 comprises a tubular body 21, the inner diameter of which slidably receives the body 13 and has a flange 22 at one end portion thereof providing a shoulder 23. The outer side of this flange 22 is provided with diametrically opposite openings 24 for receiving a spanner wrench or similar tool. The said body 21 is provided with a catch element designated generally 25 (see Figure 7) which may conveniently be in the form of oppositely disposed L-shaped or bayonet-like slots 26 each having one branch thereof extending axially from the other end of said body 21, and the other branch thereof extending laterally from said axial branch. One edge of the lateral branch of the bayonet slot 26 extends on a curvature of the radius of the projection 19' and provides a recess 27 in which said projection 19' rests when in the locked position thereof, it, of course, being apparent that upon assembly the projection 19 will first be guided through the axially extending branch of the slot 26 and then relatively turned to position the same to engage the said recess 27. The walls of this recess 27 provide an inclined surface 28 which joins the edge 29 of said slot 26. The width of the said lateral branch is made of a size sufficient to permit the projections 19' to be clear of the recess upon relative rotation of said members 11 and 12 to separate the same from each other in a manner which will hereinafter appear.

The body is also provided with a second flange 30 which, for manufacturing reasons, may be a separate collar secured to the said body in any convenient manner, such as by means of a tight frictional engagement therewith. Said flange is also provided with an annular groove 31 into which there is similarly provided a radially extending abutment 32 (see Figure 3) which may be a pin secured to the flange and extending into the body 21 to be secured in position such as by a frictional engagement. The flange 30 is positioned at a location on the said body 21 to have the bottom of the groove 31 positioned at least inwardly of the edge 33 of the right angularly extending portion of the said slot 26 and with the groove positioned to be opposite to the said groove 16 when the two members 11 and 12 are telescopically related. The body 21 is also provided with an anti-friction bearing 34, the inner edge 35 of which abuts against the shoulder 23 and is frictionally secured to the body 21 in a usual manner. In assembling these said members 11 and 12 to be in locked position, the member 11 is inserted into the member 12 with the projections 19 in register with the axial branch of the slots 26 and moved toward each other to clear the upper end of the edge 29 and then the member are relatively rotated to position the projections 19' in register with the recesses 28 in interlocking relation, as shown in Figures 2 and 3. A coil spring 36 is positioned to surround the body 21 with the ends of the spring projecting into the grooves 16 and 31 and resting against the bottom thereof with the spring placed under compression to exert a force on these members 11 and 12 in opposing directions tending to separate the said members and also tending to move the projections 19' into greater frictional engagement with the said recesses 27, thus holding the said members 11 and 12 in locked engagement with each other.

The spring 36 is not physically attached to either of said members 11 and 12 and the free ends of the spring engage against the said abutments 18, 32, as best seen in Figure 6, which abutments are in line one over the other in the locked position of said latch element and catch. In the assembling of the members 11 and 12, the ends of the spring 36 are positioned to engage against the abutments 18, 32 which are so located relative to the said elements 19 and slot 26 that a slight torque will be placed in the said spring 36 in aligning the element 19 with the slot 26 to be received therein. Further relative turning of the said members 11 and 12 to position the element 19 into register to be received in the recess 27 will place additional torque in the spring, tending to turn the said members 11 and 12 in an opposite direction or in a direction tending to move said projections 19' along the inclined surface 28 and out of the recess. However, the torque placed in the spring will not be of a sufficient strength to move the said projections 19' along the inclined surface 28 against the opposing compression force of the spring 36. However, when a force, such as impact with a surface, acts on one of said members 11 and 12 and sufficient to move the same axially thereof relative to the other against the compression of the spring and thus move said element 19 out of engagement with the abutment 27 of recess 25, as shown in Figure 4, a distance sufficient to clear the inclined wall 28, the said torque of said spring will then be sufficient to relatively rotate said members in a direction to move the projections 19' out of the lateral branches of the slots 26 and into register with the axial branches 26' thereof, so that when the compressing force is released the element 19 will move out of the slot 26, as shown in Figure 5, under the expanding force of the spring 36.

In order to attach the device to a parachute the means for such purpose will necessarily vary with the particular type of parachute employed. In Figures 1 and 2 there is shown a member designated generally 39 for this purpose but which is merely illustrative. This member comprises as annulus 40 of a proper dimension having a central bore 41 of a size to frictionally receive the outer race 42 of the said bearing 34 and is also provided with a reduced bore 43 which provides a shoulder 44 against which the said outer race 42 rests. A second annulus or ring 45 having a bore 46 of a size substantially similar to the said bore 43 is positioned to be concentric with the annulus 40 and to rest upon the outer side thereof with the marginal inner edge portion thereof extending in overlapping relation with the said outer race 42. A circular plate 47 is positioned concentric to the ring 45 in overlapping relation therewith and bolts 48 extend through said plate 47 and ring 45 to threadingly engage the annulus 40 and thereby secure said attaching member 39 to the body 21. The ring 45 is of a thickness sufficiently greater than the thickness of the flange 22 so as to provide a clearance between the plate 47 and said ring to permit rotational or oscillating motion between said body 21 and annulus 40. The annulus 40 is provided with a plurality of swivel connections 49 for attaching the shroud lines 50 of a parachute.

The load to be launched from an airplane, which may be any article of a non-military nature or of a military nature, for example a missile such as a torpedo indicated generally 51, is secured to the member 11 as by means of a threaded member 52 which extends into engagement with the threaded opening 17. Said threaded member 52 may be part of or otherwise secured to project from the tail end of the torpedo and will transmit therethrough such impact as will be received by the torpedo upon landing. In launching the torpedo from an airplane the speed at which the same will drop wil be checked or controlled by the parachute which will be of a size predetermined by those familiar in this art to control the said dropping of the torpedo to land within the specific area designated. However, the speed at which the said missile or torpedo will strike the surface of the water will provide an impact of a sufficient force so that when transmitted to the member 11 will act on said member 11 sufficiently to overcome the compression opposing force of the spring 36 and cause a relative axial movement of the said members 11 and 12 to move the said element 19 out of the recess 27, as previously described and shown in Figure 4. Upon the moving of said element 19 from engagement with the recess, the torque in the spring 36 will now move the element 19 out of the lateral branch of the slot 26 to the axial branch 26' thereof, which will permit expansion of the spring 36 to separate the parts, as previously described.

The strength of the spring will be chosen so as to provide for a secure holding of members 11 and 12 to each other prior to the launching of the load from the airplane and also for a sufficient force to separate said members upon the registering of the projections 19' with the branches 26' of the bayonet slot 26. However, after launching of the load from the airplane, the weight of the load will also add to the spring pressure to more firmly hold the said members 11 and 12 in the locked position.

In order to insure that the device is properly set prior to attaching the load and parachute thereto, the device 10 is preset at the place of manufacture and a removable lock pin 53 is received in proper aligned openings passing diametrically through both members, as shown in Figure 3. Prior to the launching or to the attaching of the device to the said parachute and load, the pin 53 is pulled out from the device, thereby freeing the same to operate under the conditions of operation above described.

It will now be apparent that we have disclosed a parachute load release device which is simple of construction, has few parts and which will operate to release the load upon impact thereof on landing.

We claim:

1. In combination, a parachute, a load, means for detachably securing the load to the parachute comprising a keeper member and a latch member for engaging said keeper member, said keeper and latch members being relatively rotated in one direction for engagement with each other and relatively rotated in the other direction for separation thereof, resilient means for applying a torque force on said members in a direction tending to separate said members from each other, blocking means carried by one of said members and movable therewith and engageable by the other of said members for opposing the operation of said resilient means, said resilient means additionally holding said blocking means in blocking engagement, said members being responsive to an impact received by said load upon the landing thereof to be moved axially thereby relative to each other to move the said other of said members out of engagement with said blocking means to free said resilient means to act to separate said members.

2. In combination, a parachute, a load, means for detachably securing the load to the parachute comprising a pair of members, means to secure one member to the parachute and thrust transferring means to attach the load to the other member, spring means loading the members for relative rotation and also loading the members to urge the same apart, abutment means on said members to prevent rotative movement and axial movement in one direction when in one position but upon compression of said spring means causing said abutment means to disengage and permit rotation and upon release the force causing compression causing separation of the members along a path angularly removed from said abutment means to avoid the same and cause separation.

3. A parachute load release device comprising a tubular keeper member having an L-shaped slot in the side wall thereof with a first branch extending axially of said member and opening at one end thereof and a second branch extending substantially laterally of the said first branch, a latch member telescopically received in said keeper member and having a projection thereon guided in said first branch to be moved into said second branch by a relative rotation of said members to detachably interlock the same against axial movement in a direction to separate the same, a coil spring positioned both in compression and for applying a torque force acting on said members tending to move the same axially in a direction to separate said members from each other, means on said members engageable by the ends of said spring for receiving a torque force from said spring in a direction tending to move said projection out of said second branch and into register with said first branch, means in said second branch for blocking the movement of said projection out of said second branch, and means carried by one of said members responsive to an impact received thereon for moving said members toward each other against the pressure of said spring to move said projection from said blocking means to free said spring to apply said torque on said members.

4. A parachute load release device comprising a pair of telescoping members axially and rotatively movable relative to each other, a latch carried by one of said members, a keeper carried by the other of said members for engagement with said latch at one position of said members for blocking axial movement thereof in a direction to separate the same, said members being movable to a second position to permit axial movement of said member in said direction to separate the same, a coil compression spring acting on said members in a direction tending to move the same axially in a direction to separate said members, and under torque acting on said members in a direction tending to move said member to the said second position and blocking means engaging one of said members for opposing the operation of said spring, said members being responsive to a force applied thereto to move said member out of engagement with said blocking means to free said spring to act to separate said members.

5. A release device comprising a keeper member and a latch member for engaging said keeper member, said keeper and latch members being relatively rotated in one direction for engagement with each other and relatively rotated in the other direction for separation thereof, resilient means for moving said members from each other and for applying a torque force on said members in a direction tending to relatively rotate said members in a direction to move the same into relative position to permit separation of said members from each other under urge of said resilient means, blocking means carried by one of said members and movable therewith and engageable by the other of said members for opposing the relative rotation of said members under urge of said resilient means, said resilient means additionally holding said blocking means engaged with the other of said members, said members being responsive to an impact received thereon axially thereof to be moved axially thereby relative to each other to move the said other of said members out of engagement with said blocking means to free said resilient means to act to separate said members.

6. In a release device as set forth in claim 5 wherein said keeper member has a bayonet slot and said latch member has a projection received in said slot, said blocking means comprising a recess in the lateral branch of said bayonet slot engageable by said projection.

7. In a release device as set forth in claim 5 wherein said members are telescopically related and provided with oppositely disposed annular shoulders, and said resilient means is a combined torque and compression spring surrounding said members and engaging against said shoulders.

References Cited in the file of this patent

UNITED STATES PATENTS

| 1,505,318 | Berlow | Aug. 19, 1924 |
| 1,845,466 | Williams | Feb. 16, 1932 |
| 2,057,699 | Williams | Oct. 20, 1936 |
| 2,270,317 | Larson | Jan. 20, 1942 |
| 2,328,988 | Martin | Sept. 7, 1943 |
| 2,413,450 | Johnsen | Dec. 31, 1946 |
| 2,517,361 | Staats | Aug. 1, 1950 |
| 2,521,516 | Heidman et al. | Sept. 5, 1950 |
| 2,543,862 | Manahan | Mar. 6, 1951 |
| 2,562,459 | Hoey | July 31, 1951 |